US011032219B2

United States Patent
Brady et al.

(10) Patent No.: US 11,032,219 B2
(45) Date of Patent: Jun. 8, 2021

(54) NETWORK AWARE APPLICATION DEPENDENT ADAPTIVE PROTOCOL SELECTION FOR IOT COMMUNICATIONS

(71) Applicant: Intel Corporation, Santa Clara, CA (US)

(72) Inventors: John Brady, Celbridge (IE); Wael Guibene, Leixlip (IE); Keith Nolan, Mullingar (IE); Michael Nolan, Maynooth (IE); Mark Kelly, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 966 days.

(21) Appl. No.: 14/978,316

(22) Filed: Dec. 22, 2015

(65) Prior Publication Data

US 2017/0180277 A1 Jun. 22, 2017

(51) Int. Cl.
*H04L 12/58* (2006.01)

(52) U.S. Cl.
CPC ............ *H04L 51/04* (2013.01); *H04L 51/066* (2013.01)

(58) Field of Classification Search
CPC .............................. H04L 51/04; H04L 51/066
USPC ....................................................... 709/206
See application file for complete search history.

(56) References Cited

U.S. PATENT DOCUMENTS

| 8,341,291 B2 | 12/2012 | Twitchell, Jr. |
| 9,009,230 B1 * | 4/2015 | Matthieu ................. H04L 69/08 709/204 |
| 2006/0002425 A1 | 1/2006 | Mane et al. |
| 2006/0106914 A1 | 5/2006 | Plow et al. |

(Continued)

FOREIGN PATENT DOCUMENTS

| CN | 1968276 A | 5/2007 |
| CN | 102148863 A | 8/2011 |

(Continued)

OTHER PUBLICATIONS

Collina, Matteo, et al., "Internet of Things application layer protocol analysis over error and delay prone links", 7th Advanced Satellite Multimedia Systems Conference and the 13th Signal Processing for Space Communications Workshop (ASMS/SPSC), (Sep. 2014), 398-404.

(Continued)

*Primary Examiner* — Umar Cheema
*Assistant Examiner* — Tony Williams
(74) *Attorney, Agent, or Firm* — Schwegman Lundberg & Woessner, P.A.

(57) ABSTRACT

Disclosed in some examples are methods, systems, and devices which perform automatic selection of an application-layer communication protocol based upon one or more communication characteristics of the sending application and one or more characteristics of the network connection between the sending device and the recipient. The selection of which protocol to use may be made on a message-by-message basis, periodically at various intervals (e.g., every (Continued)

predetermined time period), once upon application initialization, or the like. By dynamically selecting an application-layer communications protocol, an application may leverage the advantages of a specific protocol given the communication characteristics of the application and characteristics of the network connection at that time.

18 Claims, 4 Drawing Sheets

(56) References Cited

U.S. PATENT DOCUMENTS

| | | | |
|---|---|---|---|
| 2006/0129650 A1* | 6/2006 | Ho | H04L 67/2804 709/207 |
| 2006/0235987 A1 | 10/2006 | Goto et al. | |
| 2008/0025230 A1* | 1/2008 | Patel | H04L 41/5022 370/252 |
| 2008/0049630 A1* | 2/2008 | Kozisek | H04L 41/0823 370/250 |
| 2012/0042060 A1* | 2/2012 | Jackowski | H04L 47/2475 709/224 |
| 2012/0117172 A1 | 5/2012 | Hickson et al. | |
| 2012/0311051 A1 | 12/2012 | Banks et al. | |
| 2014/0067902 A1* | 3/2014 | Wang | H04L 67/02 709/201 |
| 2014/0286354 A1* | 9/2014 | Van De Poel | G06F 9/542 370/463 |

FOREIGN PATENT DOCUMENTS

| | | |
|---|---|---|
| EP | 2356797 A1 | 8/2011 |
| EP | 3395046 B1 | 3/2020 |
| IN | 2015DE03210 A | 10/2015 |
| IN | 3210DEL2015 A | 10/2015 |
| JP | 2004102507 A | 4/2004 |
| JP | 2007150697 A | 6/2007 |
| WO | 2014182692 | 11/2014 |
| WO | WO-2015040350 A1 | 3/2015 |
| WO | 2017112116 | 6/2017 |

OTHER PUBLICATIONS

Davis, Ernesto Garcia, et al., "Improving Packet Delivery Performance of Publish/Subscribe Protocols in Wireless Sensor Networks", Sensors 13(1), (Jan. 2013), 648-680.

Durkop, Lars, et al., "Performance evaluation of M2M protocols over cellular networks in a lab environment", 18th International Conference on Intelligence in Next Generation Networks (ICIN), (Feb. 2015), 70-75.

Lee, Shinho, et al., "Correlation Analysis of MQTT Loss and Delay According to QoS Level", International Conference on Information Networking (ICOIN), (Jan. 2013), 714-717.

Luzuriaga, Jorge E, et al., "A comparative evaluation of AMQP and MQTT protocols over unstable and mobile networks", 12th Annual IEEE Consumer Communications and Networking Conference (CCNC), (Jan. 2015), 931-936.

Rosenfeld, Aaron M, et al., "Dynamic Selection of Persistence and Transport Layer Protocols in Challenged Networks", Military Communications Conference (MILCOM), (Nov. 2013), 1470-1475.

Thangavel, Dinesh, et al., "Performance evaluation of MQTT and CoAP via a common middleware", IEEE Ninth International Conference on Intelligent Sensors, Sensor Networks and Information Processing (ISSNIP), (Apr. 2014), 1-6.

Wilcox, James, et al., "Multi-Protocol Transport Layer QoS: A Performance Analysis for the Smart Grid", The Fourth International Conference on Smart Grids, Green Communications and IT Energy-aware Technologies, (2014), 13-18.

"International Application Serial No. PCT/US2016/061257, International Search Report dated Feb. 10, 2017", 4 pgs.

"International Application Serial No. PCT/US2016/061257, Written Opinion dated Feb. 10, 2017", 4 pgs.

"Japanese Application Serial No. 2016-225920, Office Action dated Dec. 12, 2017", (English Translation), 5 pgs.

"European Application Serial No. 16879614.2, Extended European Search Report dated May 14, 2019", 8 pgs.

"European Application Serial No. 16879614.2, Response filed Jun. 27, 2019 to Extended European Search Report dated May 14, 2019", 24 pgs.

"Singaporean Application Serial No. 10201609771R, Invitation to Respond to Written Opinion dated Sep. 3, 2019", 11 pgs.

"Singaporean Application Serial No. 10201609771R, Response filed Feb. 3, 2020 to Invitation to Respond to Written Opinion dated Sep. 3, 2019", 20 pgs.

"International Application Serial No. PCT/US2016/061257, International Preliminary Report on Patentability dated Jul. 5, 2018", 6 pgs.

"Japanese Application Serial No. 2016-225920, Response filed Mar. 9, 2018 to Office Action dated Dec. 12, 2017", w/ English claims, 20 pgs.

* cited by examiner

NETWORK AWARE APPLICATION DEPENDENT ADAPTIVE PROTOCOL SELECTION FOR IOT COMMUNICATIONS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright tights whatsoever. The following notice applies to the software and data as described below and in the drawings that form a part of this document: Copyright Intel, Inc., All Rights Reserved.

TECHNICAL FIELD

Embodiments pertain to network communications. Some embodiments relate to adaptive selection of application-layer communication protocols. Additional embodiments relate to the adaptive selection of application-layer communication protocols in an Internet of Things (IoT) environment.

BACKGROUND

Communication protocols define rules that allow two or more entities of a communication system to exchange information. Communication protocols may define rules for message formats, address formats, address mappings, routing, detection of transmission errors, acknowledgements, timeouts, retries, flow controls, sequence controls, and the like.

Communication protocols may be layered, with each layer fulfilling a subset of the tasks necessary for end-to-end communication. For example, the Internet Engineering Task Force (IETF) has defined a suite of layers for communication across the Internet called the Internet protocol suite and encompasses many different layered protocols. Other layer models exist including the Open Systems Interconnect (OSI) model.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
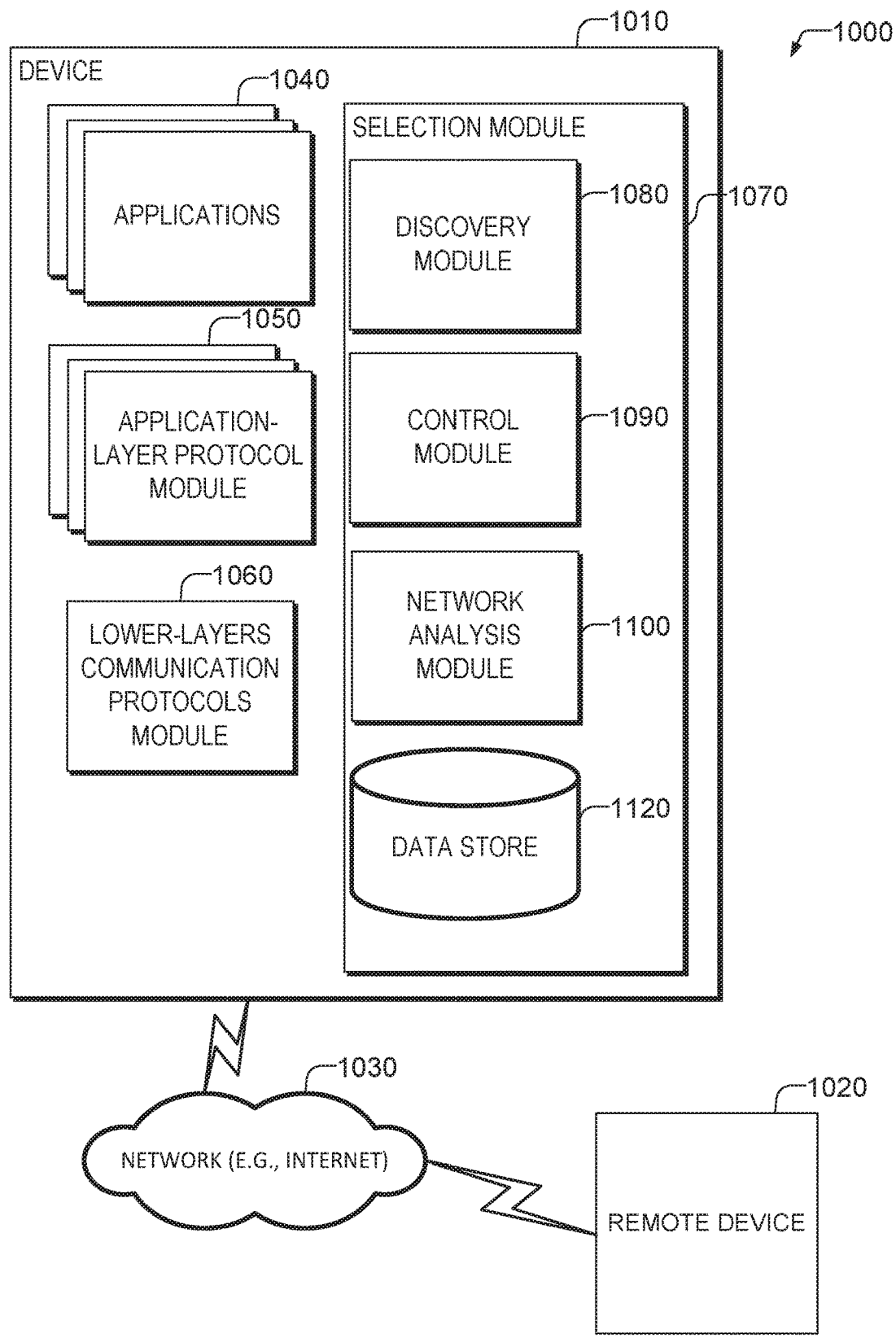
FIG. 1 is a schematic of a network according to some examples of the present disclosure.

One emerging technology that utilizes communication protocols is the Internet of Things (IoT). The IoT is a network of physical objects or "things" embedded within electronics, software, and sensors which enables these objects to collect and exchange data between themselves and between other computing devices. Standards groups have begun the process of forming standards that specify procedures for device discovery, communications between devices, service discovery, security, and other procedures used in forming and maintaining IoT networks. Example groups include the Open Interconnect Consortium (OIC), Internet Protocol for Smart Objects (IPSO) Alliance, and the Industrial Internet Consortium.

In an example, the OIC standard specifies a series of functionalities necessary for OIC operation. The OIC framework largely operates on the Session, Presentation, and Application protocol layers of the Open Systems Interconnect model and the Application layer of the IP model. These standards utilize existing networking technologies for lower layers of the protocol stacks (e.g., the Physical, Data Link, Network, and Transport communication protocols of the OSI model). The OIC framework provides for Identification and Addressing, Discovery, Resource Model, Device Management, Security, Messaging, and CRUDN. CRUDN stands for Create, Retrieve, Update, Delete, and Notify—which specifies operations defined for manipulating OIC resources. The standards specify a number of acceptable application-layer communications protocols to use with IoT networks. Examples include Constrained Application Protocol (CoAP), and HyperText Transfer Protocol (HTTP).

In sum, the IoT environment is likely to support a number of application-layer communications protocols such as: CoAP, HTTP, MQ Telemetry Transport (MQTT), MQTT for sensor networks (MQTT-SN), Advanced Message Queuing Protocol (AMQP), Extensible Messaging and Presence Protocol (XMPP), Real Time Transport Protocol (RTP), OPC Unified Architecture (OPC UA), and the like. The choice of an appropriate application-layer communications protocol is currently left to the developers of IoT applications during development. The chosen protocol is typically selected based upon the perceived use cases, including an anticipated network environment. However, not every device will be used within the use cases perceived at design time, and more importantly, not every network environment will match the developer's anticipated network environment. Certain application-layer communications protocols and messaging pattern combinations may provide higher performance in terms of latency, reliability and bandwidth utilization in certain real-world network environments compared to other such combinations. Thus, a one-size-fits-all selection of an application-layer communication protocol may lead to non-optimal results.

Disclosed in some examples are methods, systems, and devices which perform automatic selection of an application-layer communication protocol based upon one or more communication characteristics of the sending application and one or more characteristics of the network connection between the sending device and the recipient device. The selection of which protocol to use may be made on a message-by-message basis, periodically at various intervals (e.g., every predetermined time period), once upon application initialization, or the like. By dynamically selecting an application-layer communications protocol, an application may leverage the advantages of a specific protocol given the communication characteristics of the application and characteristics of the network connection at that time.

Adaptively selecting the application-layer communication protocols allows for a distributed network of devices that may react to both dynamic application requirements and network conditions. Furthermore, this will significantly reduce network traffic generated and the cost of conveying information. In one example implementation, by using adaptive application-layer communications protocol selection, testing has shown transmission time for a gateway device to backhaul communication may be reduced by 80% over Long Term Evolution (LTE) networks and by 45% over 3G cellular networks based upon transmission of 0-10 Kbytes of data over MQTT, CoAP and OPC-UA. The selection algorithm used in this test selects the protocol that minimizes transmission time for each message size. The algorithm selects CoAP (or OPC UA, equally) for a payload size of 1 kb and OPC-UA for payload sizes 1-8 kb and MQTT (or OPC UA equally) for payloads from 8-10kb.

One additional benefit of the protocol selection technique disclosed herein is that newly added protocols may be utilized by old applications. Thus, taking advantage of new technology to assist old applications.

Turning now to FIG. 1, a schematic of a network environment 1000 is shown according to some examples of the present disclosure. Network environment 1000 may be an IoT network environment in various examples. Device 1010 communicates with remote device 1020 over network 1030. Device 1010 in various examples may be an IoT device, a desktop computer, a laptop computer, a smartphone, a server computer, or other computing device. Device 1010 may be coupled to network 1030 through wired or wireless means. For example, device 1010 may utilize Wi-Fi (networks configured to operate according to an Institute for Electronics and Electrical Engineers (IEEE) 802.11 family of standards, cellular (e.g., 3G, 4G, and 5G networks), Ethernet, and the like. Device 1010 may take the role of a client device, a server device, or both.

Device 1010 may support one or more applications 1040. Applications 1040 may be IoT applications, such as a sensor application, a thermostat application, a lighting application, and the like. In other examples, applications 1040 may be end user applications such as an internet browser, an email application, a word processing application, a spreadsheet application, and the like. Applications 1040 send and receive data over network 1030 to one or more other remote devices, including remote device 1020 using one or more communication protocols, such as application-layer communication protocols. Remote device 1020 may be the same as or different than device 1010 and may have the role of a client device, a server device, or both. Remote device 1020 in some examples may be an IoT device, a desktop computer, a laptop computer, a smartphone, a server computer, or other computing device.

Device 1010 may include one or more application-layer communications protocol modules 1050 which may implement one or more application-layer communication protocols. Examples include CoAP, MQTT, OPC UA, HTTP, and the like, In some examples, application-layer communications protocol modules 1050 may be implemented inside applications 1040. Application-layer communications protocol modules 1050 each implement a respective messaging protocol. Messages sent from applications 1040 are received by one of application-layer communications protocol modules 1050. Application-layer communications protocol module 1050 corresponding to the desired application-layer communications protocol then constructs the message according to its corresponding protocol and sends it to lower-layers communication protocols module 1060.

Device 1010 may include lower-layers communication protocols module 1060 which may implement layers of a communication protocol stack lower than the application-layer. Example layers implemented may include one or more of the physical, data link, network, transport, session, internet, and presentation protocols. Example protocols implemented include one or more of: Ethernet, Internet Protocol, Transport Control Protocol (TCP), protocols for the 802.11 standard (e.g., PHY, Medium Access Control, Logical Link Control, and the like), and the like. Lower-layers communication protocols module 1060 may receive the message from application-layer communications protocol modules 1050 and may encapsulate the data in one or more messages according to the various protocols implemented by lower-layers communication protocols module 1060 and transmit the message across network 1030 to one or more remote devices (e.g., remote device 1020). Similarly, for messages coming from remote device 1020, lower-layers communication protocols module 1060 may process the incoming message as appropriate for the protocols that lower-layers communication protocols module 1060 implements and pass the application-layer message to the application-layer communications protocol module 1050 corresponding to the application-layer in the message. Example processing may include adjusting flow control parameters, routing, processing and sending acknowledgments, and the like.

Device 1010 may include a selection module 1070. Selection module may dynamically select an appropriate application-layer communication protocol from the available application-layer communication protocols, Discovery module 1080 may engage in protocol discovery to discover the application-layer communication protocols supported by remote device 1020. In some examples, discovery module 1080 may do this by sending an HTTP GET request message (formatted by an application-layer communication protocol module 1050) and passing this message to lower-layers communication protocols module 1060 for sending to remote device 1020. The response from remote device 1020 to device 1010 may be a list of available application-layer communication protocols. The supported application-layer communication protocols of remote device 1020 may be stored in a data store 1120, indexed by a unique identifier of remote device 1020. The protocol discovery may be repeated periodically to ensure that the list of supported protocols for the remote device 1020 is up-to-date. For example, the protocol discovery may be performed periodically (e.g., after a predetermined period of time has elapsed since the last protocol discovery), after every communication session, once, before every message sent by device 1010 to remote device 1020, or the like. in some examples, periodically refreshing the supported protocols allows for the use of newer protocols as they become available.

Discovery module 1080 determines which communication protocols are supported by device 1010. This may be done by means of interprocess communication with the applications 1040 or the application-layer communications protocol modules 1050. In other examples, this may be accomplished by reading the information from data store 1120. The application-layer communications protocol modules 1050 or applications 1040 may register supported application-layer communication protocols with a registry in data store 1120.

Discovery module 1080 may also communicate with applications 1040 to determine one or more communication characteristics of the applications 1040. This may be done upon one or more of: receipt of a message from one of applications 1040, installation of an application 1040, installation of selection module 1070, and the like. In some examples, once the communication characteristics of the application 1040 are determined they are stored in the data store 1120 and used for subsequent messaging. The communication characteristics of an application 1040, once stored, may be periodically updated (e.g., after a predetermined threshold of time has elapsed since the last update).

Example communication characteristics include one or more of: one way latency tolerance, two way latency tolerance (e.g., Round Trip Time), packet loss tolerance, jitter tolerance, bandwidth requirements, whether an acknowledgement is required, bit-error rate tolerance, error rate tolerances, availability, whether the message needs to be delivered at least once, whether the message may only be delivered once, and the like. These characteristics may be termed Quality of Service (QoS) characteristics.

Network analysis module 1100 may determine one or more characteristics of the network connection between device 1010 and the recipient of the communication (e.g., a remote device such as remote device 1020). Example network characteristics include one way latency, two way latency (e.g., Round Trip Time), packet loss, jitter, bandwidth, bit-error rate, error rate, availability, and the like. Network characteristics may be determined by sending one or more test packets across the network, or from analysis of past traffic received or sent to remote device 1020. For example, sending Internet Control Message Protocol (ICMP) echo request packets (e.g., pinging the remote device) may allow device 1010 to determine RTT, error rates, packet loss, and the like. In some examples, characteristics such as jitter may be determined from analysis of the variability in connection latency over time. These network connection characteristics may be stored in data store 1120. For characteristics that are calculated using measurements over time, like jitter, the historical values such as latency may be stored in data store 1120 and the characteristic may be periodically calculated by the discovery module 1080.

Data store 1120 may comprise one or more data storage devices and may be managed by one or more relational databases. The database may be searched, items added, deleted or moved using one or more commands issued to the relational databases. Commands may be formatted according to one or more programming languages such as a Structured Query Language (SQL). Data store 1120 may store communication characteristics of one or more applications (e.g., applications 1040), network connection characteristics between the device and one or more remote devices over time, and the like. For example, data store may store a historical database table which stores communication parameters of past transmissions such as [protocol, latency, application latency tolerance, whether an acknowledgement was required, payload size, and transmission time] for each message sent over a network connection to a particular remote device. Each communication session with a different remote device may be stored in a separate table. The application latency tolerance and acknowledgement requirements are communication characteristics of the application that sent the message. An example historical database may look like:

| Protocol | Measured Network Latency (ms) | Application Characteristics | | Payload Size (kB) | Actual Transmission Time (ms) |
|---|---|---|---|---|---|
| | | Latency Tolerance (ms) | Acknowledgement Required? | | |
| CoAP | 35 | 38 | Acknowledgement not Required | 3 | 40 |
| MQTT | 35 | 38 | Acknowledgement not Required | 3 | 35 |
| OPC UA | 35 | 38 | Acknowledgement not Required | 3 | 15 |
| ... | ... | ... | ... | ... | ... |

The fields in the historical database are from past messages with the above characteristics. For example, a 3 kB message, with a measured network latency prior to transmission of 35 ms, sent with CoAP had an actual transmission time of 40 ms. The application that sent the message required a latency tolerance of 38 ms, and did not require an acknowledgement. Note that the historical database captures real world messaging from multiple applications 1040 on the device. This allows each application on the device to benefit from the information gained from all past messages sent to a particular destination device regardless of the application which sent the message.

While the tables of the historical databases have been described as specific to a particular destination device, in other examples, the historical database may be common to all destinations. This has the benefit of having more complete data, but may be less accurate as network conditions may vary substantially between different network routes to each different device.

In yet additional examples, the historical database may aggregate historical data for different remote devices that have similar network locations in the same table. For example, two different devices on the same domain, same subnet, local network, or the like may have their historical data stored together. This provides additional data to determine selection of an appropriate application-layer communication protocol, but at the same time taking steps to minimize the variability between network conditions that occur between different devices. Whether or not two remote devices are similar enough to have network connection characteristics with the device stored in the same table may be determined, for example, based upon comparisons of the IP addresses of the remote devices.

Control module 1090 may utilize the one or more network connection characteristics and the one or more communication characteristics of the application sending the message to select an appropriate application messaging protocol using the historical database. In various examples, selection module 1070 may select the messaging protocol that has the fastest transmission time while also meeting the minimum communication characteristics of the application.

For example, selection module 1070 may use the historical database to select an optimal application-layer communication protocol for the current message. Selection module 1070 first selects rows of the table that meet the minimum application characteristics of the application that is sending the message, matches the current measured latency of the network (or is within a predetermined threshold of the measured latency), and matches the payload size (or is within a predetermined threshold of the payload size). Then, selection module 1070 picks the row that historically produced the lowest transmission time. The protocol in the protocol column of the selected row is selected as the application-layer communication protocol to use for this message.

In various examples, this adaptive protocol selection may be implemented transparently to applications 1040. For example, the applications 1040 may be designed to send messages using various protocols (e.g., HTTP) via application-layer communication protocol modules 1050. Selection module 1070 on the device may intercept this message prior to transmission, select the ideal protocol, remove the message contents and repackage the message using the selected protocol via application-layer communication protocol modules 1050. Selection module 1070 may also translate incoming messages from the selected protocol to the application's native protocol upon receiving a response or other message from the remote device and then pass this incoming message to the application module. Selection module 1070 may keep track of the original protocol of each message in data store 1120 and may retranslate any responses into the original protocol. In other examples, applications 1040 may send the message contents to selection module 1070 directly who may then select the appropriate protocol, form the message using the application-layer communications protocol modules 1050 and send the message using the lower layers communication protocols module 1060.

In other examples, the method disclosed herein may be implemented in the application itself and various services may be defined which may assist in this implementation. For example, selection module 1070 may provide one or more library functions to the applications to assist in the selection of the appropriate application-layer communication protocol. The application 1040 may then pass the message to the appropriate application-layer communication protocol module 1050 corresponding to the selected protocol.

Figure 2:
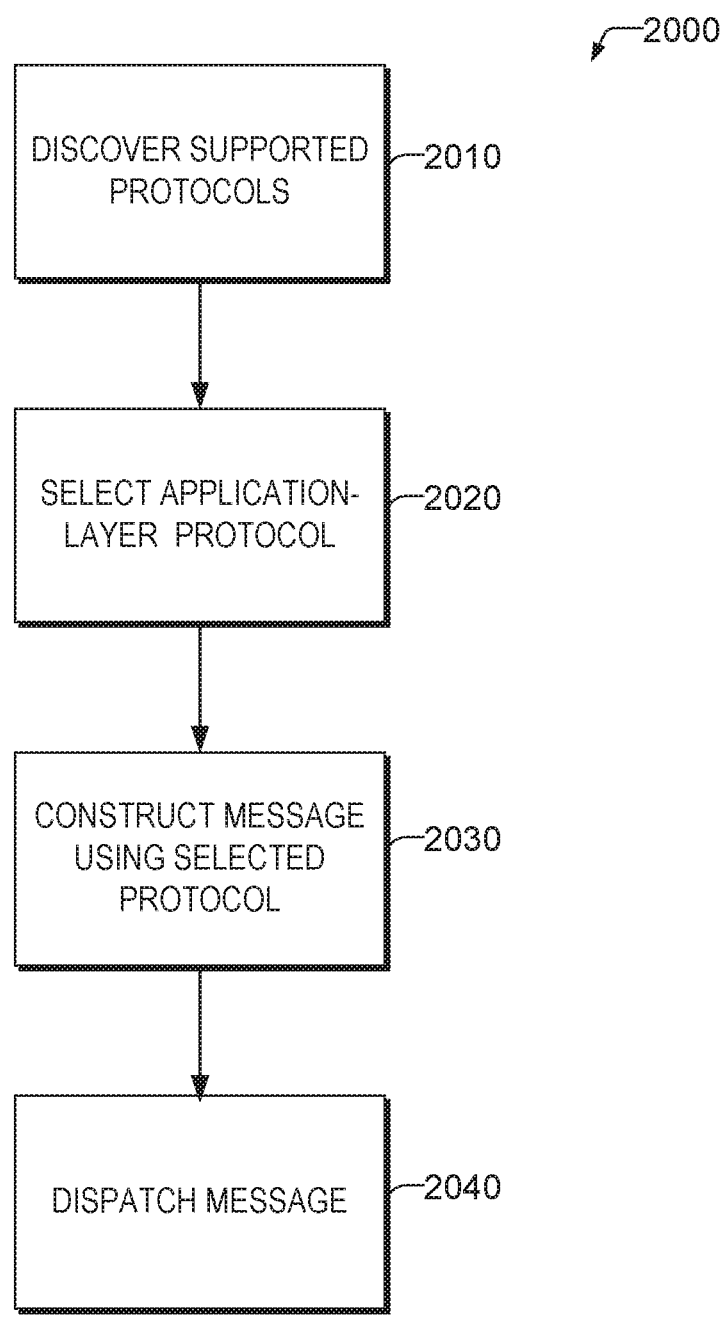
FIG. 2 is a flowchart of a method of dynamically selecting an application-layer communications protocol for a message is shown according to some examples of the present disclosure.

Turning now to FIG. 2, a flowchart of a method 2000 of dynamically selecting an application-layer communications protocol for a message is shown according to some examples of the present disclosure. This process may be performed on a message-by-message basis once an application 1040 has sent a message (e.g., a source application). At operation 2010, the device (e.g., the discovery module 1080 of FIG. 1) may discover supported application-layer communication protocols on the remote device to which it is communicating. In some examples, this may be accomplished by reading data saved in a cache, or a database such as data store 1120. The supported application-layer communication protocols may have already been determined and stored. If no data is stored in data store 1120, the supported application-layer communication protocols may be determined by requesting the available message brokers (e.g., the available application-layer protocol modules on the remote device) from the remote device using an application-layer communications protocols such as HTTP. In these examples a Representational State Transfer (RESTful) query using an HTTP GET may be utilized to a known URL of the remote device to obtain the available application-layer communication protocols. This information may then be saved to a data store (e.g., data store 1120 of FIG. 1.). The information may be saved using one or more database commands. For example, if the database is a SQLite database, one or more commands to insert a row into a table that is indexed by remote device.

At operation 2020, the device selects an appropriate application-layer communication protocol. This operation will be further explained in the later discussion of FIG. 3. Once the application-layer communications protocol is selected, the message is constructed according to the rules for message formats and construction specified by the selected application-layer communications protocol at operation 2030. This may be performed by one of the application-layer communication protocol modules 1050. In some examples, this operation comprises obtaining the current message payload from the application that is sending the message. The message payload may be obtained directly through the application. For example, the application 1040 may call a selection function provided by the selection module 1070 where a function parameter is the message. The selection module 1070 may then route the message to the appropriate application-layer protocol module 1050 that corresponds to the selected application-layer protocol. In other examples, the application 1040 may route the message to the selected application-layer protocol itself. In this example, the selection module simply performs the selection and leaves it up to the application 1040 to route the message appropriately. In still other examples, the message may be extracted from a message already encoded in a different application-layer communications protocol selected by the application in cases in which the operation of the selection module is transparent to the end application). The message payload may be constructed, formatted, and headers necessary may be added. Example formats include Comma Separated Values (CSV), JavaScript Object Notation (JSON), and Extensible Markup Language (XML).

At operation 2040, the message may be dispatched to the remote device. In some examples, this involves passing the message through lower-level communication protocols. For example, by appending TCP/IP headers—as implemented by the lower-layers communication protocols module 1060 of FIG. 1. and finally transmitting it on a physical medium (e.g., a wire, through a wireless transmission, and the like). For example, using the network interface device 4020 from FIG. 4. In some examples, this may require initiating a connection to the remote device (e.g., a TCP session, an application-layer connection, or the like). Once the message is sent, the historical database may be updated with communication parameters of the transmission. For example, the historical database may have a row added that stores a tuple of [the selected protocol, the message transmission time, communication characteristics of the application, payload size, the characteristics of the network connection between the device and the remote device]. For example, the row may be inserted through the use of a SQLite statement. In some examples, the historical database may be data store 1120 of FIG. 1.

Figure 3:
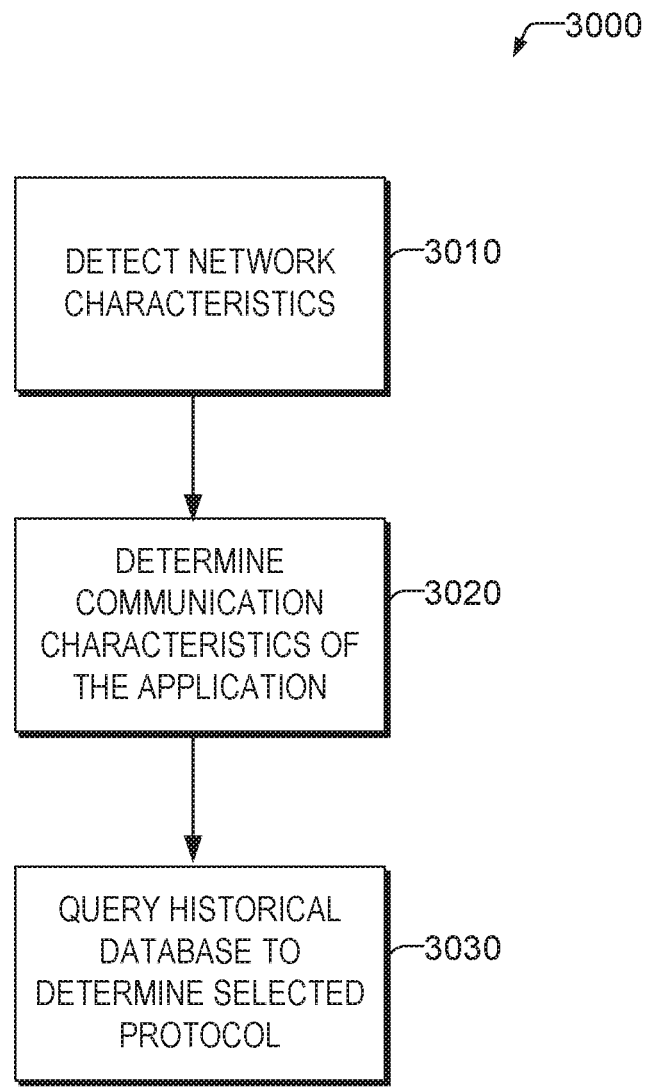
FIG. 3 is a flowchart of a method of dynamically selecting an application-layer communication protocol is shown according to some examples of the present disclosure.

Turning now to FIG. 3, a flowchart of a method 3000 of dynamically selecting an application-layer communication protocol is shown according to some examples of the present disclosure. At operation 3010, the device may detect one or more characteristics of the network connection between the device and the recipient of the communication (e.g., the remote device). For example; this may be done by network analysis module 1100 of FIG. 1. These characteristics may include one way latency, two way latency (e.g., Round Trip Time (RTT)), packet loss, jitter, bandwidth, bit-error rate, error rate, availability, and the like. In some examples, this may he done by issuing a "ping" command, which issues an ICMP echo request to the remote device to test RTT. The one or more network characteristics may be stored in a local database such as data store 1120 of FIG. 1. For example, a row or column may be inserted in a table through the use of a SQLite statement.

At operation 3020, the device (e.g., the discovery module 1080 of FIG. 1) may determine one or more communication characteristics of the application that is sending the message. In some examples, this may involve a query (e.g., a SQLite query command) to the local database (e.g., data store 1120) or a cache, to retrieve previously stored communication characteristics of the application (previously stored through a previous communication with the application or the application may place the characteristics in the database). If the local database does not contain information on the communication characteristics of the application, the device may query the application through an application programming interface (API). For example, the selection module 1070 may query the application 1040 using an API implemented by both the selection module 1070 and the application 1040. In other examples, when the application 1040 is installed, this information may be written to a registry or other central store (e.g., data store 1120 or some other data storage location). In yet additional examples, the communication characteristics may be determined based upon an observation of the messaging history of the application. For example; latency requirements may be determined through observing the application send retry requests and then inferring that the previous message did not arrive in time and so the latency requirement is less than the network latency to the destination at the time. Similarly, acknowledgement requirements may also be observed as acknowledgements sent/received by the application. Payload size may be determined based upon the size of the messages sent by the application.

Once the communication characteristics of the application are determined, they may be stored in a database data store 1120). Example communication characteristics include one or more of: one way latency tolerance, two way latency tolerance (e.g., Round Trip Time), packet loss tolerance, jitter tolerance, bandwidth requirements, whether an acknowledgement is required, bit-error rate tolerance, error rate tolerances, availability, whether the message needs to be delivered at least once, whether the message may only be delivered once, and the like.

At operation 3030, the system (e.g., the control module 1090) may query a historical database to determine an optimal application-layer communications protocol. For example, the selection module 1070 may use the historical database to select an optimal application-protocol for the current message. The selection module 1070 selects rows of the table that meet the minimum application characteristics of the application that is sending the message, matches the current measured latency of the network (or is within a predetermined threshold of the measured latency), and matches the payload size (or is within a predetermined threshold of the payload size). Then, the selection module 1070 picks the row that historically produced the lowest transmission time from those selected rows. The application-layer communication protocol that is in the protocol column of the database is then selected as the optimal application-layer communication protocol.

In some examples, if the number of rows selected by the device from the historical database that match the application's communication characteristics is below a predetermined threshold, there may not be enough historical information to properly select an application-layer communications protocol. In this situation, a protocol that meets the communication characteristics of the application may be selected randomly.

It is to be understood that when this process is repeated at different times, the selected application-layer communication protocols may be different. For example, one message sent by the application may be transmitted using a first selected application-layer communication protocol and other messages sent at different times may be sent using other, different application-layer communication protocols as a result of new measurements of the characteristics of the network connection (e.g., the ping times to the remote device change) or as a result of changes to the communication characteristics of the applications.

In some examples, the supported protocols of the remote device may change to incorporate new protocols. Thus, applications written prior to the new protocol may dynamically benefit from this new protocol without a change in the code of the application.

While the preceding described an IoT environment as a potential use case for the protocol selection of the present invention, other, non IoT use cases may be utilized, for example, devices in non IoT environments. Furthermore, the preceding described the adaptive selection of application-layer communication protocols, however, one of ordinary skill in the art with the benefit of this disclosure will appreciate that other layers of a protocol stack may be adaptively selected.

Figure 4:
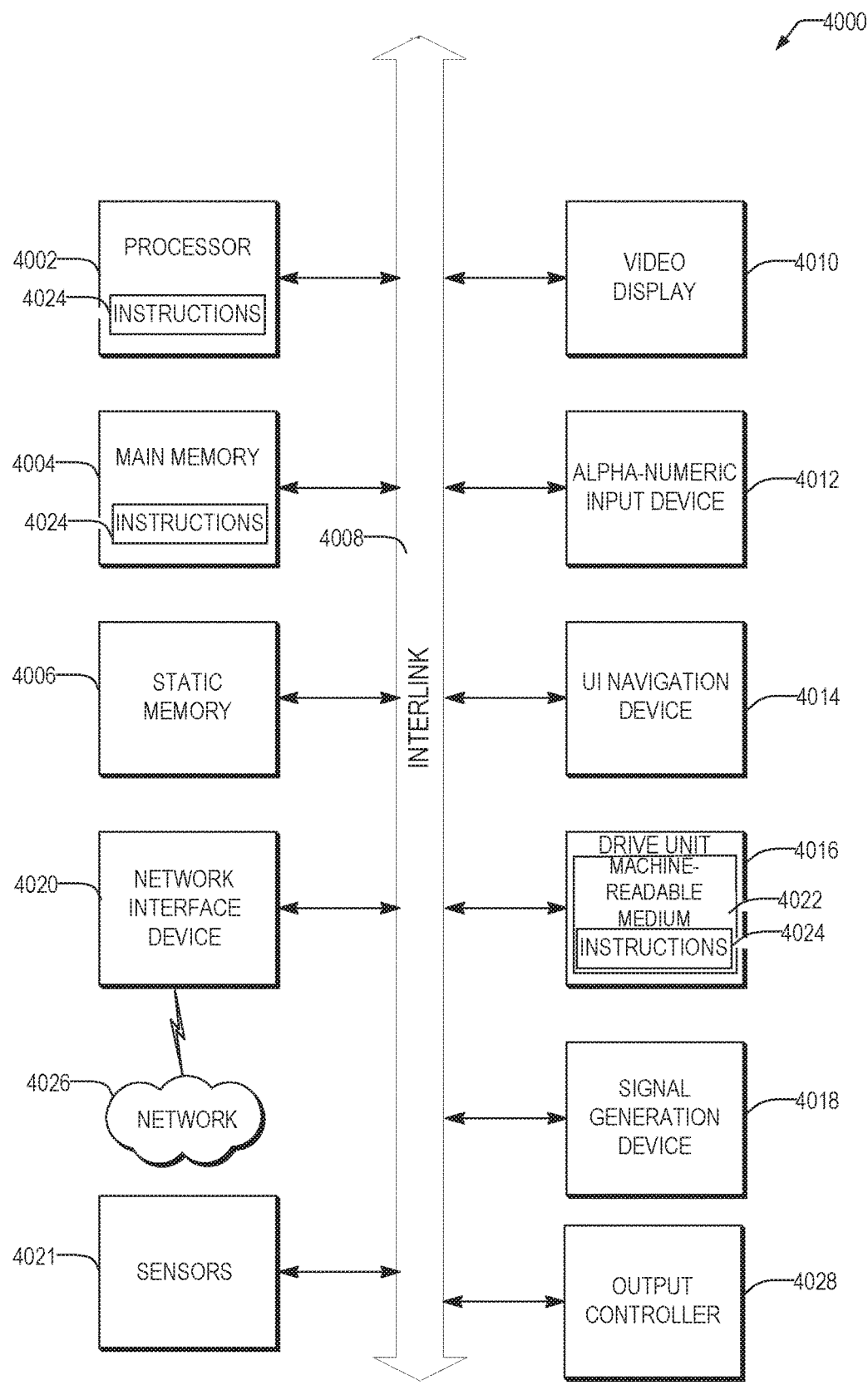
FIG. 4 is a block diagram illustrating an example of a machine upon which one or more embodiments may be implemented.

FIG. 4 illustrates a block diagram of an example machine 4000 upon which any one or more of the techniques (e.g., methodologies) discussed herein may perform. In alternative embodiments, the machine 4000 may operate as a stand-alone device or may be connected (e.g., networked) to other machines. In a networked deployment, the machine 4000 may operate in the capacity of a server machine, a client machine, or both in server-client network environments. In an example, the machine 4000 may act as a peer machine in peer-to-peer (P2P) (or other distributed) network environment. The machine 4000 may be a IoT device, personal computer (PC), a tablet PC, a set-top box (STB), a personal digital assistant (PDA), a mobile telephone, a smart phone, a web appliance, a network router; switch or bridge, or any machine capable of executing instructions (sequential or otherwise) that specify actions to be taken by that machine. Machine 4000 may implement the device 1010 of FIG. 1. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor (i.e., a computer processor) configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 4000 may include a hardware processor 4002 (e.g., a central processing unit (CPU), a graphics processing unit (GPU), a hardware processor core, or any combination thereof), a main memory 4004 and a static memory 4006, some or all of which may communicate with each other via an interlink (e.g., bus) 4008. The machine 4000 may further include a display unit 4010, an alphanumeric input device 4012 (e.g., a keyboard), and a user interface (UI) navigation device 4014 (e.g., a mouse). In an example, the display unit 4010, input device 4012 and UI navigation device 4014 may be a touch screen display. The machine 4000 may additionally include a storage device (e.g., drive unit) 4016, a signal generation device 4018 (e.g., a speaker), a network interface device 4020, and one or more sensors 4021, such as a global positioning system (GPS) sensor, compass, accelerometer, or other sensor. The machine 4000 may include an output controller 4028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 4016 may include a machine readable medium 4022 on which is stored one or more sets of data structures or instructions 4024 (e.g., software) embodying or utilized by any one or more of the techniques or functions described herein. The instructions 4024 may also reside, completely or at least partially, within the main memory 4004, within static memory 4006, or within the hardware processor 4002 during execution thereof by the machine 4000. In an example, one or any combination of the hardware processor 4002, the main memory 4004, the static memory 4006, or the storage device 4016 may constitute machine readable media.

While the machine readable medium 4022 is illustrated as a single medium, the term "machine readable medium" may include a single medium or multiple media (e.g., a centralized or distributed database, and/or associated caches and servers) configured to store the one or more instructions 4024.

The term "machine readable medium" may include any medium that is capable of storing, encoding, or carrying instructions for execution by the machine 4000 and that cause the machine 4000 to perform any one or more of the techniques of the present disclosure, or that is capable of storing, encoding or carrying data structures used by or associated with such instructions. Non-limiting machine readable medium examples may include solid-state memories; and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 4024 may further be transmitted or received over a communications network 4026 (e.g., a computer network) using a transmission medium via the network interface device 4020. The Machine 4000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 4020 may include one or more physical jacks (e.g., Ethernet, coaxial, or phone jacks) or one or more antennas to connect to the communications network 4026. In an example, the network interface device 4020 may include a plurality of antennas to wirelessly communicate using at least one of single-input multiple-output (SIMO), multiple-input multiple-output (MIMO), or multiple-input single-output (MISO) techniques. In some examples, the network interface device 4020 may wirelessly communicate using Multiple User MIMO techniques.

Other Notes and Examples

Example 1 is a method for communicating with a remote device, the method comprising: using a computer processor and a network interface: discovering a set of supported application-layer communications protocols of the remote device; selecting one of the set of supported application-layer communications protocols as a selected application-layer communications protocol for a message received from a source application, based upon a characteristic of a computer network used to communicate with the remote device and a communication characteristic of the source application of the message; constructing the message according to the selected application-layer communications protocol; and transmitting the message to the remote device over the computer network using the selected application-layer communications protocol and the network interface.

In Example 2, the subject matter of Example 1 optionally includes: receiving a second message for transmission to the remote device from the source application; selecting one of the set of supported application-layer communications protocols as a second selected application-layer communications protocol for the message based upon a new measurement of the characteristic of the computer network used to communicate with the remote device and the communication characteristic of the source application of the message; constructing the second message according to the second selected application-layer communications protocol; and transmitting the message to the remote device over the computer network, wherein the selected application-layer communications protocol used to construct and transmit the message is a different application-layer communications protocol than the second selected application-layer communications protocol used to construct the second message.

In Example 3, the subject matter of any one or more of Examples 1-2 optionally include, wherein the selected application-layer communications protocol is one of: a HyperText Transfer Protocol (HTTP), a Constrained Application Protocol (CoAP), MQ Telemetry Transport (MQTT) protocol, and an OPC Unified Architecture (UA) protocol.

In Example 4, the subject matter of any one or more of Examples 1-3 optionally include, wherein discovering the set of supported application-layer communications protocols of the remote device comprises requesting available message brokers from the remote device using a Hypertext Transfer Protocol (HTTP) GET request.

In Example 5, the subject matter of any one or more of Examples 1-4 optionally include, wherein selecting one of the set of supported application-layer communications protocols of the remote device as the selected application-layer communications protocol based upon the characteristic of the network used to communicate with the remote device and the communication characteristic of the source application comprises: detecting the characteristic of the computer network; determining the communication characteristic of the source application; and selecting rows of a database matching the characteristic of the computer network and the communication characteristic of the source application; and selecting the application-layer communications protocol corresponding to a selected row that has a lowest transmission time.

In Example 6, the subject matter of Example 5 optionally includes, wherein the characteristic of the computer network is one of: one way latency, two way latency, packet loss, jitter, bandwidth, bit-error rate, error rate, or availability.

In Example 7, the subject matter of any one or more of Examples 5-6 optionally include, wherein the communication characteristic is one of: one-way latency tolerance, two-way latency tolerance, packet loss tolerance, jitter tolerance, bandwidth requirements, whether an acknowledgement is required, bit-error rate tolerance; error rate tolerances, availability, whether the message needs to be delivered alt least once, or whether the message may only be delivered once.

In Example 8, the subject matter of any one or more of Examples 5-7 optionally include; updating the database based upon a communication parameter of the transmitted message.

Example 9 is a device comprising: a processor; a network interface; a non-transitory machine readable medium, comprising instructions, which when performed by the processor, cause the processor to: discover a set of supported application-layer communications protocols of a remote device; select one of the set of supported application-layer communications protocols as a selected application-layer communications protocol for a message received from a source application, based upon a characteristic of a computer network used to communicate with the remote device and a communication characteristic of the source application of the message; construct the message according to the selected application-layer communications protocol; and transmit the message to the remote device over the computer network using the selected application-layer communications protocol and the network interface.

In Example 10, the subject matter of Example 9 optionally includes, wherein the instructions comprise instructions to cause the processor to: receive a second message for transmission to the remote device from the source application; select one of the set of supported application-layer communications protocols as a second selected application-layer communications protocol for the message based upon a new measurement of the characteristic of the computer network used to communicate with the remote device and the communication characteristic of the source application of the message; construct the second message according to the second selected application-layer communications protocol; and transmit the message to the remote device over the computer network, wherein the selected application-layer communications protocol used to construct and transmit the message is a different application-layer communications protocol than the second selected application-layer communications protocol used to construct the second message.

In Example 11, the subject matter of any one or more of Examples 9-10 optionally include, wherein the selected application-layer communications protocol is one of: a HyperText Transfer Protocol (HTTP), a Constrained Application Protocol (CoAP), MQ Telemetry Transport (MQTT) protocol, and an OPC Unified Architecture (UA) protocol.

In Example 12, the subject matter of any one or more of Examples 9-11 optionally include, wherein the instructions that cause the processor to discover the set of supported application-layer communications protocols of the remote device comprises instructions to cause the processor to: request available message brokers from the remote device using a Hypertext Transfer Protocol (HTTP) GET request.

In Example 13, the subject matter of any one or more of Examples 9-12 optionally include, wherein the instructions that cause the processor to select one of the set of supported application-layer communications protocols of the remote device as the selected application-layer communications protocol based upon the characteristic of the network used to communicate with the remote device and the communication characteristic of the source application comprises the instructions to cause the processor to: detect the characteristic of the computer network; determine the communication characteristic of the source application; and select rows of a database matching the characteristic of the computer network and the communication characteristic of the source application; and select the application-layer communications protocol corresponding to a selected row that has a lowest transmission time.

In Example 14, the subject matter of Example 13 optionally includes, wherein the characteristic of the computer network is one of: one way latency, two way latency, packet loss, jitter, bandwidth, bit-error rate, error rate, or availability.

In Example 15, the subject matter of any one or more of Examples 13-14 optionally include, wherein the communication characteristic is one of: one-way latency tolerance, two-way latency tolerance, packet loss tolerance, jitter tolerance, bandwidth requirements, whether an acknowledgement is required, bit-error rate tolerance, error rate tolerances, availability, whether the message needs to be delivered at least once, or whether the message may only be delivered once.

In Example 16, the subject matter of any one or more of Examples 13-15 optionally include, wherein the instructions comprise instructions to cause the processor to: update the database based upon a communication parameter of the transmitted message.

Example 17 is a non-transitory machine readable medium, comprising instructions, which when performed by the machine, cause the machine to: discover a set of supported application-layer communications protocols of a remote device; select one of the set of supported application-layer communications protocols as a selected application-layer communications protocol for a message received from a source application, based upon a characteristic of a computer network used to communicate with the remote device and a communication characteristic of the source application of the message; construct the message according to the selected application-layer communications protocol; and transmit the message to the remote device over the computer network using the selected application-layer communications protocol.

In Example 18, the subject matter of Example 17 optionally includes, wherein the instructions comprise instructions to cause the processor to: receive a second message for transmission to the remote device from the source application; select one of the set of supported application-layer communications protocols as a second selected application-layer communications protocol for the message based upon a new measurement of the characteristic of the computer network used to communicate with the remote device and the communication characteristic of the source application of the message; construct the second message according to the second selected application-layer communications protocol; and transmit the message to the remote device over the computer network, wherein the selected application-layer communications protocol used to construct and transmit the message is a different application-layer communications protocol than the second selected application-layer communications protocol used to construct the second message.

In Example 19, the subject matter of any one or more of Examples 17-18 optionally include, wherein the selected application-layer communications protocol is one of: a HyperText Transfer Protocol (HTTP), a Constrained Application Protocol (CoAP), MQ Telemetry Transport (MQTT) protocol; and an OPC Unified Architecture (UA) protocol.

In Example 20; the subject matter of any one or more of Examples 17-19 optionally include, wherein the instructions that cause the processor to discover the set of supported application-layer communications protocols of the remote device comprises instructions to cause the processor to: requesting available message brokers from the remote device using a Hypertext Transfer Protocol (HTTP) GET request.

In Example 21, the subject matter of any one or more of Examples 17-20 optionally include, wherein the instructions that cause the processor to select one of the set of supported application-layer communications protocols of the remote device as the selected application-layer communications protocol based upon the characteristic of the network used to communicate with the remote device and the communication characteristic of the source application comprises instructions to cause the processor to: detect the characteristic of the computer network; determine the communication characteristic of the source application; and select rows of a database matching the characteristic of the computer network and the communication characteristic of the source application; and select the application-layer communications protocol corresponding to a selected row that has a lowest transmission time.

In Example 22, the subject matter of Example 21 optionally includes, wherein the characteristic of the computer network is one of: one way latency, two way latency, packet loss, jitter, bandwidth, bit-error rate, error rate, or availability.

In Example 23, the subject matter of any one or more of Examples 21-22 optionally include, wherein the communication characteristic is one of: one-way latency tolerance, two-way latency tolerance, packet loss tolerance, jitter tolerance, bandwidth requirements, whether an acknowledgement is required, bit-error rate tolerance, error rate tolerances, availability, whether the message needs to be delivered at least once, or whether the message may only be delivered once.

In Example 24, the subject matter of any one or more of Examples 21-23 optionally include, wherein the instructions comprise instructions to cause the processor to: update the database based upon a communication parameter of the transmitted message.

Example 25 is a device comprising: means to discover a set of supported application-layer communications protocols of a remote device; means to select one of the set of supported application-layer communications protocols as a selected application-layer communications protocol for a message received from a source application, based upon a characteristic of a computer network used to communicate with the remote device and a communication characteristic of the source application of the message; means to construct the message according to the selected application-layer communications protocol; and means to transmit the message to the remote device over the computer network using the selected application-layer communications protocol.

In Example 26, the subject matter of Example 25 optionally includes: means to receive a second message for transmission to the remote device from the source application; means to select one of the set of supported application-layer communications protocols as a second selected application-layer communications protocol for the message based upon a new measurement of the characteristic of the computer network used to communicate with the remote device and the communication characteristic of the source application of the message; means to construct the second message according to the second selected application-layer communications protocol; and means to transmit the message to the remote device over the computer network, wherein the selected application-layer communications protocol used to construct and transmit the message is a different application-layer communications protocol than the second selected application-layer communications protocol used to construct the second message.

In Example 27, the subject matter of any one or more of Examples 25-26 optionally include; wherein the selected application-layer communications protocol is one of: a HyperText Transfer Protocol (HTTP), a Constrained Application Protocol (CoAP), MQ Telemetry Transport (MQTT) protocol; and an OPC Unified Architecture (UA) protocol.

In Example 28; the subject matter of any one or more of Examples 25-27 optionally include, wherein the means to discover the set of supported application-layer communications protocols of the remote device comprises means to request available message brokers from the remote device using a Hypertext Transfer Protocol (HTTP) GET request.

In Example 29; the subject matter of any one or more of Examples 25-28 optionally include, wherein the means to select one of the set of supported application-layer communications protocols of the remote device as the selected application-layer communications protocol based upon the characteristic of the network used to communicate with the remote device and the communication characteristic of the source application comprises: means to detect the characteristic of the computer network; means to determine the communication characteristic of the source application; and means to select rows of a database matching the characteristic of the computer network and the communication characteristic of the source application; and means to select the application-layer communications protocol corresponding to a selected row that has a lowest transmission time.

In Example 30, the subject matter of Example 29 optionally includes, wherein the characteristic of the computer network is one of: one way latency, two way latency, packet loss, jitter, bandwidth, bit-error rate, error rate, or availability.

In Example 31; the subject matter of any one or more of Examples 29-30 optionally include, wherein the communication characteristic is one of: one-way latency tolerance, two-way latency tolerance, packet loss tolerance, jitter tolerance, bandwidth requirements, whether an acknowledgement is required, bit-error rate tolerance, error rate tolerances, availability, whether the message needs to be delivered at least once, or whether the message may only be delivered once.

In Example 32, the subject matter of any one or more of Examples 29-31 optionally include means to update the database based upon a communication parameter of the transmitted message.

What is claimed is:

1. A method for communicating with a remote device, the method comprising:
   using a computer processor and a network interface:
      discovering, by communicating with the remote device, a set of at least two supported application-layer communications protocols of the remote device;
      receiving a message from a source application executing on the computer processor;
      selecting a first application-layer communications protocol from the set of supported application-layer communications protocols for transmission of the message, the selection based upon a characteristic of a computer network used to communicate with the remote device and a communication characteristic of the source application of the message;
      constructing the message according to the first application-layer communications protocol;
      transmitting the message to the remote device over the computer network using the first application-layer communications protocol and the network interface; and
      subsequent to transmitting the message:
         selecting a second application-layer communications protocol from the set of supported application-layer communications protocols, the second application-layer communications protocol different from the first application-layer communications protocol;
         constructing a second message from the source application according to the second application-layer communications protocol; and
         transmitting the second message to the remote device over the computer network using the second application-layer communications protocol.

2. The method of claim 1, wherein the set of at least two supported application-layer communications protocols comprise two or more of: a HyperText Transfer Protocol (HTTP), a Constrained Application Protocol (CoAP), MQ Telemetry Transport (MQTT) protocol, and an OPC Unified Architecture (UA) protocol.

3. The method of claim 1, wherein discovering the set of supported application-layer communications protocols of the remote device comprises requesting available message brokers from the remote device using a Hypertext Transfer Protocol (HTTP) GET request.

4. The method of claim 1, wherein selecting the first application-layer communications protocol from the set of supported application-layer communications protocols for transmission of the message, the selection based upon the characteristic of the network used to communicate with the remote device and the communication characteristic of the source application comprises:
   detecting the characteristic of the computer network;
   determining the communication characteristic of the source application;
   selecting rows of a database matching the characteristic of the computer network and the communication characteristic of the source application; and
   selecting the first application-layer communications protocol corresponding to a selected row that has a lowest transmission time.

5. The method of claim 4, wherein the characteristic of the computer network is one of: one way latency, two way latency, packet loss, jitter, bandwidth, bit-error rate, error rate, or availability.

6. The method of claim 5, wherein the communication characteristic is one of: one-way latency tolerance, two-way latency tolerance, packet loss tolerance, jitter tolerance, bandwidth requirements, whether an acknowledgement is required, bit-error rate tolerance, error rate tolerances, availability, whether the message needs to be delivered at least once, or whether the message may only be delivered once.

7. The method of claim 6, comprising, updating the database based upon a communication parameter of the transmitted message.

8. A device comprising:
   a processor;
   a network interface; and
   a non-transitory machine readable medium, comprising instructions, which when performed by the processor, cause the processor to:
      discover, by communications with the remote device, a set of at least two supported application-layer communications protocols of a remote device;
      receive a message from a source application executing on the computer processor;
      select a first application-layer communications protocol from of the set of supported application-layer communications protocols for transmission of the message, the selection based upon a characteristic of a computer network used to communicate with the remote device and a communication characteristic of the source application of the message;
      construct the message according to the first application-layer communications protocol;
      transmit the message to the remote device over the computer network using the first application-layer communications protocol and the network interface; and
      subsequent to transmitting the message:
         select a second application-layer communications protocol from the set of supported application-layer communication protocols, the second application-layer communications protocol different from the first application-layer communications protocol;

construct a second message from the source application according to the second application-layer communications protocol; and transmit the second message to the remote device over the computer network using the second application-layer communications protocol.

9. The device of claim 8, wherein the set of at least two supported application-layer communications protocols comprises two or more of: a HyperText Transfer Protocol (HTTP), a Constrained Application Protocol (CoAP), MQ Telemetry Transport (MQTT) protocol, and an OPC Unified Architecture (UA) protocol.

10. The device of claim 8, wherein the instructions that cause the processor to discover the set of supported application-layer communications protocols of the remote device comprises instructions to cause the processor to: request available message brokers from the remote device using a Hypertext Transfer Protocol (HTTP) GET request.

11. The device of claim 8, wherein the instructions that cause the processor to select the first application-layer communications protocol from the set of supported application-layer communications protocols based upon the characteristic of the network used to communicate with the remote device and the communication characteristic of the source application comprises the instructions to cause the processor to:

detect the characteristic of the computer network;

determine the communication characteristic of the source application;

select rows of a database matching the characteristic of the computer network and the communication characteristic of the source application; and select the first application-layer communications protocol corresponding to a selected row that has a lowest transmission time.

12. The device of claim 11, wherein the characteristic of the computer network is one of: one way latency, two way latency, packet loss, jitter, bandwidth, bit-error rate, error rate, or availability.

13. The device of claim 11, wherein the communication characteristic is one of: one-way latency tolerance, two-way latency tolerance, packet loss tolerance, jitter tolerance, bandwidth requirements, whether an acknowledgement is required, bit-error rate tolerance, error rate tolerances, availability, whether the message needs to be delivered at least once, or whether the message may only be delivered once.

14. The device of claim 11, wherein the instructions comprise instructions to cause the processor to: update the database based upon a communication parameter of the transmitted message.

15. A non-transitory machine readable medium, comprising instructions, which when performed by the machine, cause the machine to:

discover, through communication with the remote device, a set of at least two supported application-layer communications protocols of a remote device;

receive a message from a source application executing on the machine;

select a first application-layer communications protocol from of the set of supported application-layer communications protocols for transmission of the message, the selection based upon a characteristic of a computer network used to communicate with the remote device and a communication characteristic of the source application of the message;

construct the message according to the first application-layer communications protocol;

transmit the message to the remote device over the computer network using the first application-layer communications protocol; and subsequent to transmitting the message:

select a second application-layer communications protocol from the set of supported application-layer communication protocols, the second application-layer communication protocol different from the first application-layer communication protocol;

construct a second message from the source application according to the second application-layer communication protocol; and transmit the second message to the remote device over the computer network using the second application-layer communication protocol.

16. The non-transitory machine readable medium of claim 15, wherein the set of at least two supported application-layer communications protocols comprises two or more of: a HyperText Transfer Protocol (HTTP), a Constrained Application Protocol (CoAP), MQ Telemetry Transport (MQTT) protocol, and an OPC Unified Architecture (UA) protocol.

17. The non-transitory machine readable medium of claim 15, wherein the instructions that cause the machine to discover the set of supported application-layer communications protocols of the remote device comprises instructions to cause the machine to: request available message brokers from the remote device using a Hypertext Transfer Protocol (HTTP) GET request.

18. The non-transitory machine readable medium of claim 15, wherein the instructions that cause the machine to select the first application-layer communications protocol from the set of supported application-layer communications protocols based upon the characteristic of the network used to communicate with the remote device and the communication characteristic of the source application comprises instructions to cause the machine to:

detect the characteristic of the computer network;

determine the communication characteristic of the source application;

select rows of a database matching the characteristic of the computer network and the communication characteristic of the source application; and select the first application-layer communications protocol corresponding to a selected row that has a lowest transmission time.

* * * * *

UNITED STATES PATENT AND TRADEMARK OFFICE
CERTIFICATE OF CORRECTION

PATENT NO. : 11,032,219 B2  
APPLICATION NO. : 14/978316  
DATED : June 8, 2021  
INVENTOR(S) : Brady et al.

Page 1 of 1

It is certified that error appears in the above-identified patent and that said Letters Patent is hereby corrected as shown below:

In the Claims

In Column 18, Line 30, in Claim 6, delete "claim 5," and insert --claim 4,-- therefor In Column 18, Line 37, in Claim 7, delete "claim 6," and insert --claim 4,-- therefor In Column 18, Line 52, in Claim 8, after "from", delete "of"

In Column 20, Line 2, in Claim 15, after "from", delete "of"

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*